US010156766B2

(12) United States Patent
Terashima et al.

(10) Patent No.: US 10,156,766 B2
(45) Date of Patent: Dec. 18, 2018

(54) DISPLAY DEVICE

(71) Applicant: E Ink Corporation, Billerica, MA (US)

(72) Inventors: Yasuhiro Terashima, Matsumoto (JP); Yukiyoshi Ichu, Shiojiri (JP); Akihito Matsumoto, Chino (JP)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/389,424

(22) Filed: Dec. 22, 2016

(65) Prior Publication Data

US 2017/0184940 A1 Jun. 29, 2017

(30) Foreign Application Priority Data

Dec. 25, 2015 (JP) ................. 2015-254129

(51) Int. Cl.
*G02B 26/00* (2006.01)
*G02B 26/08* (2006.01)
*G02F 1/29* (2006.01)
*G02F 1/167* (2006.01)
*F21V 8/00* (2006.01)
*G02F 1/13357* (2006.01)
*G02F 1/1335* (2006.01)

(52) U.S. Cl.
CPC ............ *G02F 1/167* (2013.01); *G02B 6/0011* (2013.01); *G02F 1/1336* (2013.01); *G02F 2001/133616* (2013.01); *G02F 2201/123* (2013.01)

(58) Field of Classification Search
CPC ............... G02F 1/167; G02F 1/133707; G02F 1/133788; G02F 1/1339; G02F 1/13452; G02F 1/133512; G02F 1/134309; G02F 1/1337; G02F 1/133723; G02F 1/133753; G02F 1/1362; G02F 1/1393; G02F 2001/133531; G02F 2001/133742; G02F 2001/133746
USPC ........ 359/237, 242, 265–267, 290–292, 295, 359/296, 298; 345/107
See application file for complete search history.

(56) References Cited

U.S. PATENT DOCUMENTS

| | | | |
|---|---|---|---|
| 2006/0072193 A1* | 4/2006 | Johnson | G02F 1/167 359/430 |
| 2015/0131309 A1* | 5/2015 | Umekawa | G02B 6/0053 362/606 |

FOREIGN PATENT DOCUMENTS

JP 2015-18060 A 1/2015

\* cited by examiner

*Primary Examiner* — Brandi Thomas
(74) *Attorney, Agent, or Firm* — Antranig Baronian

(57) ABSTRACT

A display device includes a display panel including a non-driven area and a driven area symmetric relative to a first straight line passing on the figure center of the driven area and a covering portion covering a peripheral portion of the display panel and including an opening portion symmetric relative to a second straight line passing on the figure center of the opening portion. When the first straight line and the second straight line are viewed from a first direction side, the first straight line and the second straight line are disposed in parallel to each other on a plane, and when the plane is viewed in a plan view, one side portion and the other side portion that are included in the driven area and covered by the covering portion and that are located opposite each other with the first straight line located between the one side portion and the other side portion have mutually different lengths in a direction perpendicular to the first straight line.

5 Claims, 9 Drawing Sheets

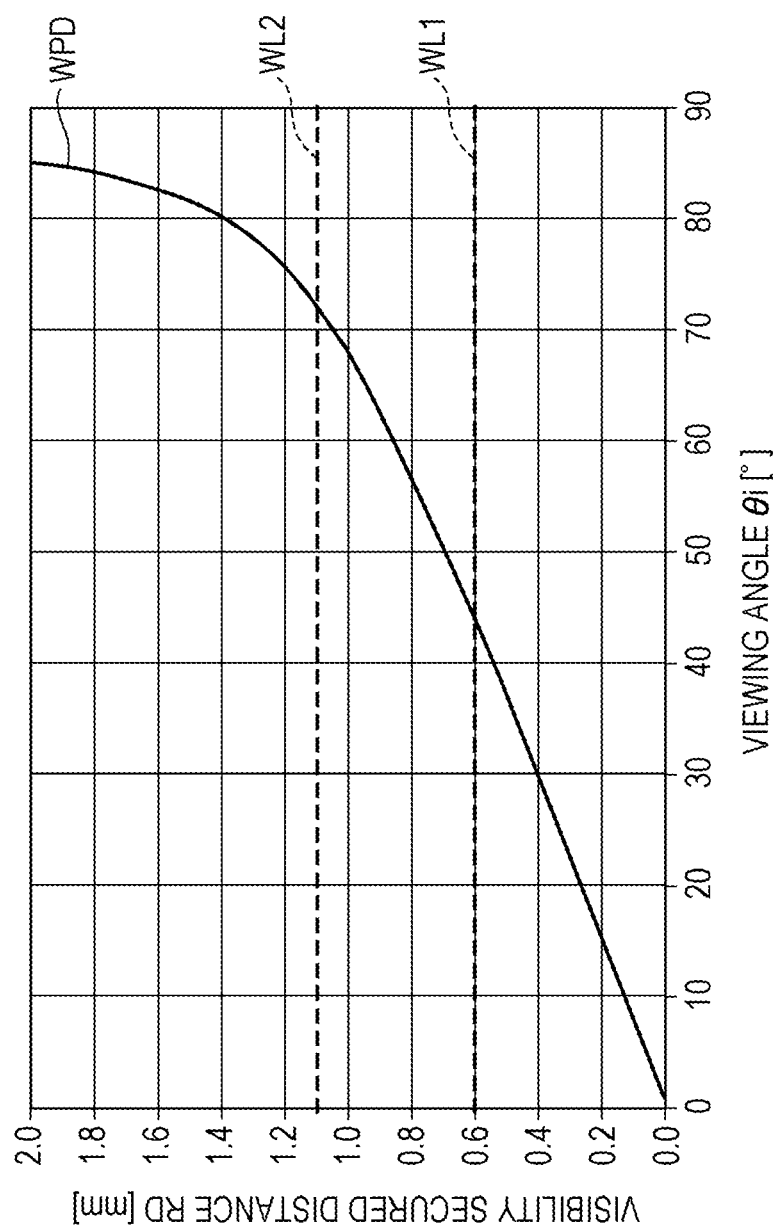

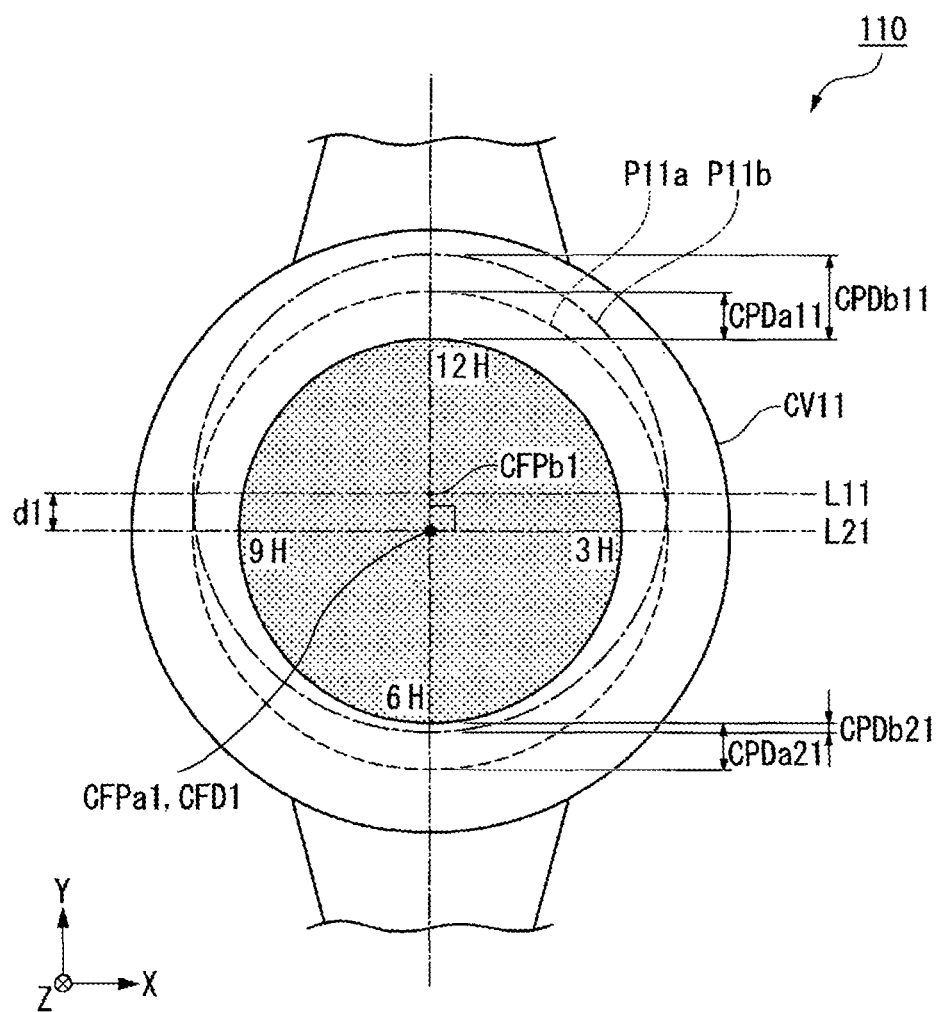

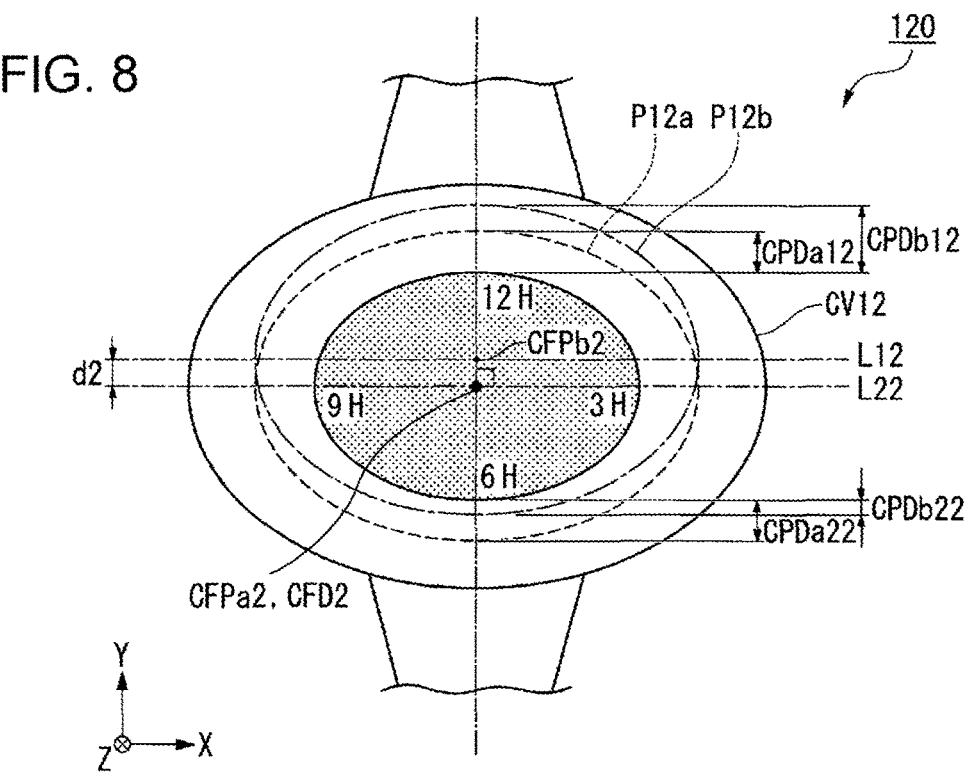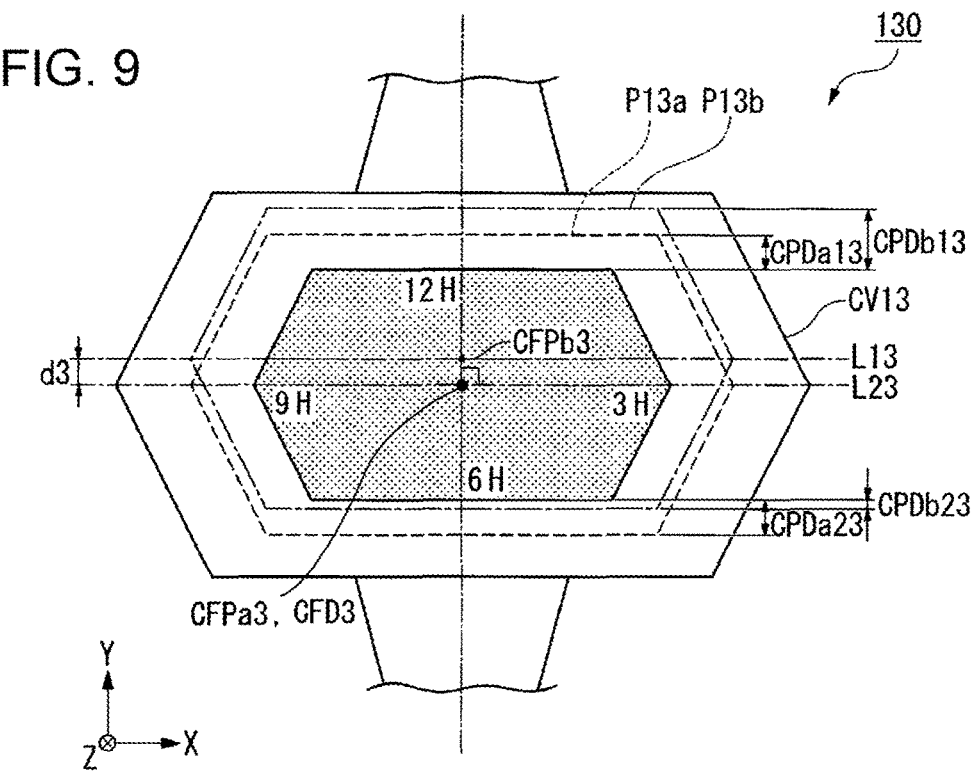

DISPLAY DEVICE

BACKGROUND

1. Technical Field

The present invention relates to a display device.

2. Related Art

In general, an electrophoretic display device (EPD) is well known as an example of display devices. For example, an electrophoretic display device including a display portion having a structure in which the space between a pair of substrates is partitioned into a plurality of spaces by partitioning walls, and a solvent in which particles having chargeability and dispersibility are injected (this solvent being referred to as a dispersion liquid hereinafter) is sealed in each of the plurality of spaces is well known. Here, the partitioning wall is produced from, for example, an insulation material.

Such an electrophoretic display device is capable of changing the content of display of the display portion by allowing a voltage to be applied to the dispersion liquid sealed in each of the spaces and sandwiched between two electrodes so as to cause two groups of particles constituting the particles, the color (displayed color) and the reflectance of particles constituting one of the two groups being different from those of particles constituting the other one of the two groups, to be each separated and moved toward a corresponding one of the two electrodes that is specified by the applied voltage. For example, a white and black display portion using two kinds of particles, one being associated with a white color (this kind of particles being referred to as "white particles"), the other one being associated with a black color (this kind of particles being referred to as "black particles"), allows the white color to be displayed through the use of light scattering of the white particles, and allows the black color to be displayed through the use of light absorption of the black particles.

Such an electrophoretic display device is constituted as, for example, a reflection type display device configured to obtain the contrast of display through the use of the reflection of outside light. In this case, the electrophoretic display device includes a light guiding plate disposed so as to be stacked and a light source, such as a front light, for illuminating a display face, taking it account a case where the electrophoretic display device is used at a dark place at night or the like. This configuration is similar to that of commercially produced electrophoretic display devices.

When a front light based illumination structure is used in a reflection type display unit, a configuration in which a light guiding plate is disposed at a position on a display face to allow light from a light source disposed at a side face of the light guiding plate to enter the light guiding plate is employed.

In the electrophoretic display device, there exists a driven area the periphery of which is enclosed by partitioning walls and in which a dispersion liquid is injected. This driven area is, for example, an area adjacent to which electrodes that supply a voltage to the dispersion liquid exist. Meanwhile, in the electrophoretic display device, there exists a non-driven area the periphery of which is enclosed by partitioning walls and in which a dispersion liquid is injected. This non-driven area is, for example, an area adjacent to which any electrode that supplies a voltage to the dispersion liquid does not exist.

With this configuration, the dispersion liquid injected in the non-driven area is unlikely to be influenced by the voltage, as compared with the dispersion liquid injected in the driven area. That is, the particles included in the dispersion liquid injected in the non-driven area are slow in their movements upon supply of the voltage, as compared with the particles included in the dispersion liquid injected in the driven area. Specifically, the display of the non-driven area is likely to become a gray color (for example, a color resulting from an uneven mixture of white and black), that is, an intermediate color between white and black. The display of the non-driven area is a display that is not intended to be viewed by a user.

As an example of such an electrophoretic display device, an electrophoretic device is disclosed in JP-A-2015-18060 (this electrophoretic device being understood to be equivalent to the electrophoretic display device). This electrophoretic device is provided with an electrophoretic layer including a dispersion medium and partitioned into a plurality of cells by partitioning walls, a frame-shaped partitioning wall disposed at the periphery of the electrophoretic layer in a plan view, and a liquid reservoir disposed between the electrophoretic layer and the frame-shaped partitioning wall in a plan view (this liquid reservoir being understood to be equivalent to the non-driven area) (see JP-A-2015-18060).

In such an electrophoretic display device, there has been a disadvantage in that the non-driven area is easy to be viewed by a user. The non-driven area is not intended to be viewed by a user, and thus, such a configuration that allows a user to view the non-driven area degrades the quality of display.

Such a disadvantage is significant particularly in a configuration in which the light guiding plate is provided in the electrophoretic display device. That is, in a configuration in which the light guiding plate is stacked on the substrate of the electrophoretic display device, the distance between the chassis and the display portion of the electrophoretic display device is increased by the thickness of the light guiding plate, and this increase of the distance between the chassis and the display portion increases a range that allows a user to view the non-driven area.

This disadvantage will be described in detail.

That is, because of an upper electrode substrate that is transparent and is disposed at a position on the dispersion liquid, a display face (the surface of the dispersion liquid) is located at a position distanced from the display frame of the chassis by the thickness of the upper electrode substrate. Thus, viewing of the display face from an oblique direction results in viewing of the boundary between the driven area and the non-driven area, and as a result, this configuration significantly degrades the quality of display.

Particularly, with respect to the front light in the reflection type display, in order to allow the entire display face to be evenly illuminated by light, a configuration that allows the light guiding plate to be disposed at a position on the display face and allows light from the light source, which is disposed at a side face of the light guiding plate, to enter the light guiding plate is typically employed. Here, when a front light based light guiding plate is disposed in a display panel (an EPD panel), the display face is located at a position further distanced from the display frame, and this configuration allows the boundary to be more easily viewed. Further, in a state in which the front light is tuned on, the light is illuminated on the dispersion liquid in the driven area and the dispersion liquid in the non-driven area, and thus, the boundary is easily viewed, as compared with a state in which the front light is turned off. As a result, the quality of display is significantly degraded.

SUMMARY

An advantage of some aspects of the invention is that a display device is provided that allows a non-driven area to be hard to be viewed to improve the quality of display.

According to one aspect of the invention, a display device includes a display panel including a non-driven area and a driven area symmetric relative to a first straight line passing on the figure center of the driven area and a covering portion covering a peripheral portion of the display panel and including an opening portion symmetric relative to a second straight line passing on the figure center of the opening portion. When the first straight line and the second straight line are viewed from a first direction side, the first straight line and the second straight line are disposed in parallel to each other on a plane, and when the plane is viewed in a plan view, one side portion and the other side portion that are included in the driven area and covered by the covering portion and that are located opposite each other with the first straight line located between the one side portion and the other side portion have mutually different lengths in a direction perpendicular to the first straight line.

In this way, the display device is configured to allow the non-driven area to be hard to be viewed. Further, this configuration improves the quality of display by the display device.

Further, according to another aspect of the invention, in the above display device, a configuration that allows the display panel to further include a first substrate, a second substrate, and a plurality of image formation portions may be employed. In this configuration, a plurality of pixel electrodes are disposed on the first substrate, and a facing electrode facing the plurality of pixel electrodes is disposed on the second substrate. Further, each of the plurality of image formation portions includes a dispersion liquid disposed between the first substrate and the second substrate and including particles and a dispersion medium, and is configured to form a display image in accordance with an electric potential difference between the facing electrode and a corresponding one of the plurality of pixel electrodes.

In this way, the display device is configured to allow the non-driven area to be hard to be viewed. Further, this configuration improves the quality of display by the display device.

Further, according to another aspect of the invention, in the above display device, a configuration that allows the above display device to further include a light source and a light guiding member may be employed. In this configuration, the light guiding member is disposed at a second substrate side opposite the first substrate, and is configured to guide light from the light source.

In this way, the display device is configured to allow the non-driven area to be hard to be viewed. Further, this configuration improves the quality of display by the display device.

Further, according to another aspect of the invention, in the above display device, a configuration that allows the driven area and the opening portion to have mutually similar shapes may be employed.

In this way, the display device is configured to allow the non-driven area to be hard to be viewed. Further, this configuration improves the quality of display by the display device.

BRIEF DESCRIPTION OF THE DRAWINGS

The invention will be described with reference to the accompanying drawings, wherein like numbers reference like elements.

FIG. 6 is a graph illustrating an example of the relationship between a visibility secured distance and a viewing angle according to the one embodiment of the invention.

FIG. 7 is a configuration diagram illustrating an outline configuration of a display device according to the one embodiment of the invention.

FIG. 8 is a configuration diagram illustrating an outline configuration of a display device according to the one embodiment of the invention.

FIG. 9 is a configuration diagram illustrating an outline configuration of a display device according to the one embodiment of the invention.

DESCRIPTION OF EXEMPLARY EMBODIMENTS

Embodiments according to the invention will be described below in detail with reference to the drawings.

First Embodiment

Outline of Display Device

A display device according to one embodiment (a first embodiment) of the invention will be described. The display device according to this embodiment is a watch. In this embodiment, it is assumed that, in a state in which a user wears a watch on his or her wrist, a case where the user views the clock face of the watch in a direction perpendicular to the clock face of the watch, or a case where the user views the clock face of the watch in a direction oblique to the clock face of the watch and extending from "6 o'clock" toward "12 o'clock", is a typical usage state.

Figure 1:
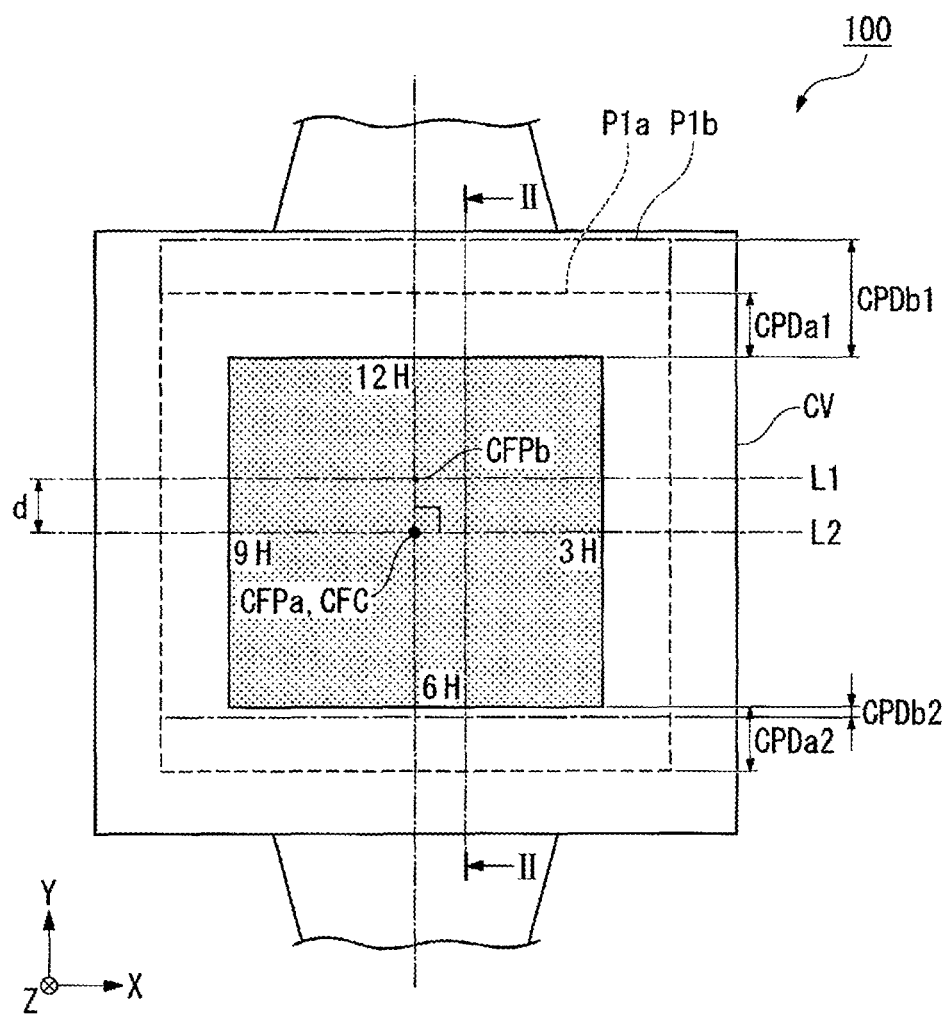
FIG. 1 is a configuration diagram illustrating an outline configuration example of a display device according to one embodiment of the invention.

FIG. 1 is a configuration diagram illustrating an outline configuration example of a display device 100 according to the one embodiment of the invention. FIG. 1 is a plan view of the display device 100. The display device 100 includes a covering portion CV and a display panel P1b. Here, FIG.

1 illustrates the position of a display panel P1*a* according to a comparison example (for example, a conventional technology) as a reference, and this display panel P1*a* is not a constituent element of the display device 100 according to this embodiment.

The covering portion CV is a chassis covering the periphery of the display panel P1*b*, and includes an opening portion. As shown in FIG. 1, the covering portion CV is disposed at a position covering the display panel P1*b*, and the periphery of the display panel P1*b* is covered by a portion other than the opening portion in the covering portion CV.

Here, an XYZ axes orthogonal coordinate system is indicated in FIG. 1. In this embodiment, the Z-axis indicates a height direction. Further, when the display device 100 is viewed from a positive Z-axis direction side toward a negative Z-axis direction side, the X-axis indicates a left and right direction (a direction from 9 o'clock toward 3 o'clock in the watch in this embodiment), and the Y-axis indicates a depth direction (a direction from 6 o'clock toward 12 o'clock in the watch in this embodiment).

In FIG. 1, the figure center of the shape of the opening portion of the covering portion CV (hereinafter, this figure center being referred to as a covering-portion shape figure center) is illustrated. Further, in this embodiment, the figure center of the display panel P1*b* (hereinafter, this figure center being referred to as a display shape figure center) is disposed at a position distanced from the covering-portion shape figure center CFC toward the positive Y-axis direction side by a distance equivalent to a length d.

Further, in this embodiment, the shape of the display panel P1*b* is symmetric relative to a first straight line L1 passing on the display shape center CFPb. Further, in this embodiment, the shape of the opening portion included in the covering portion CV is symmetric relative to a second straight line L2 passing on the covering-portion shape center CFC. Here, the first straight line L1 and the second straight line L2 are lines parallel to the X-axis. Further, in the example shown in FIG. 1, a case where the display panel P1*b* and the covering portion CV, which are included in the display device 100, have mutually similar, quadrangular shapes will be described.

In the display device according to this embodiment, clock times are displayed on the display panel P1*b*. Specifically, in the display device 100, characters indicating "12 o'clock", that is, "12 H", are displayed at a position on a straight line extending from the covering-portion shape center CFC, which indicates the center of the covering portion CV, toward the positive Y-axis direction side, and characters indicating "6 o'clock", that is, "6 H", are displayed at a position on a straight line extending from the covering-portion shape center CFC toward a negative Y-axis direction side. Further, in the display device 100, characters indicating "3 o'clock", that is, "3 H", are displayed at a position on a straight line extending from the covering-portion shape center CFC toward a positive X-axis direction side, and characters indicating "9 o'clock", that is, "9 H", are displayed at a position on a straight line extending from the covering-portion shape center CFC toward a negative X-axis direction side. In the following description, the positive Y-axis direction will be also denoted by a "12 H direction", the negative Y-axis direction will be also denoted by a "6 H direction", the negative X-axis direction will be also denoted by a "9 H direction", and the positive X-axis direction will be also denoted by a "3 H direction".

It should be noted that such clock times ("12 H", "6 H", "3 H", and "9 H" in this example) are just an example, and any other display method for the clock times may be employed.

Next, the details of the display panel P1*b* will be described with reference to FIG. 2.

Figure 2:
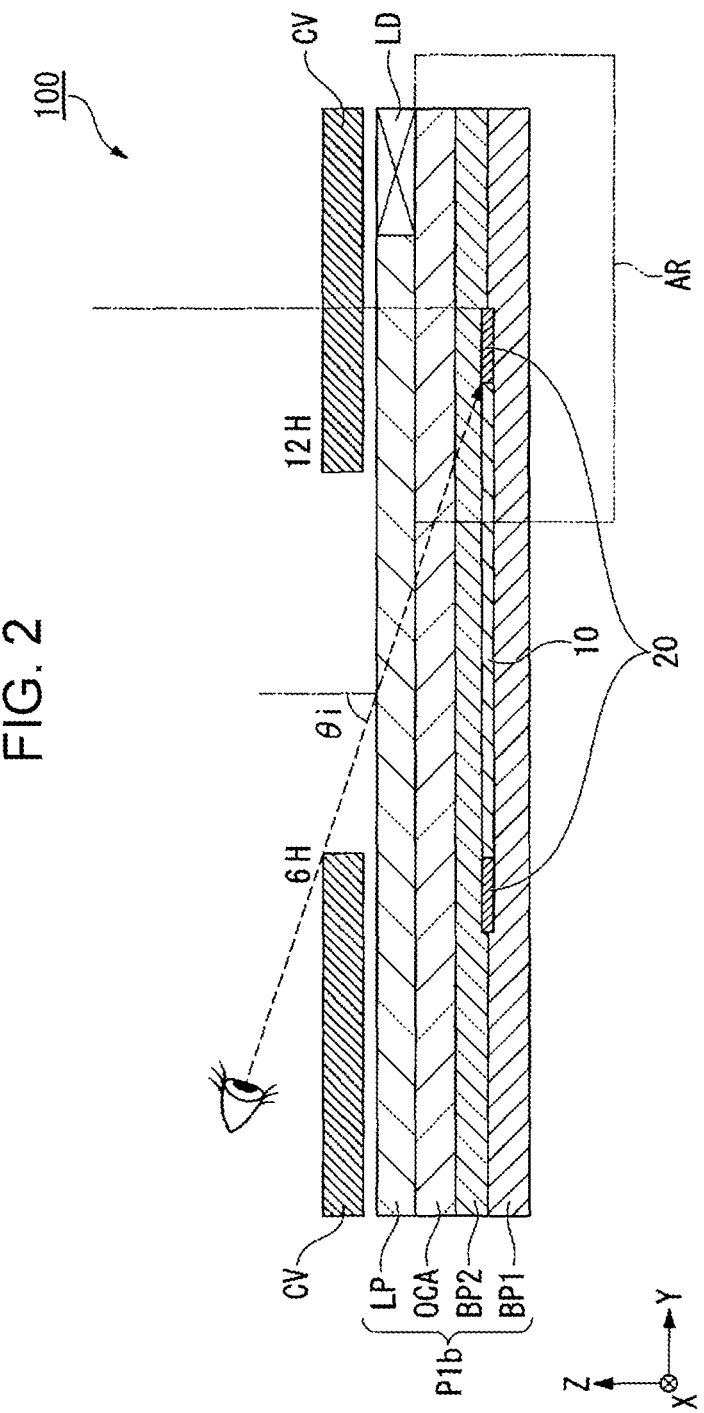
FIG. 2 is a lateral side cross-sectional view of the display device illustrated in FIG. 1 illustrating an outline configuration example of a display panel according to the one embodiment of the invention

FIG. 2 is a lateral side cross-sectional view of the display device 100 illustrated in FIG. 1 illustrating an outline configuration example of the display panel P1*b* according to the one embodiment of the invention. FIG. 2 is a cross-sectional view of the display device 100 illustrated in FIG. 1 taken along the line II-II of FIG. 1.

Configuration Example of Display Device

As shown in FIG. 2, the display device 100 according to this example includes a first substrate BP1, a second substrate BP2, a transparent adhesion layer OCA, a light guiding plate LP, a light source LD, and the covering portion CV. The first substrate BP1 and the second substrate BP2 are substrates having approximately the same size. Further, the first substrate BP1 and the second substrate BP2 each have a flat plate shape. The light source LD is disposed as a front light in order to make it easy to view the display of the display panel P1*b*. Specifically, the light source LD is disposed in a periphery portion at one end side of the light guiding plate LP, and is used as a light source light from which is allowed to enter the light guiding plate LP. The light source LD is, for example, a light emitting diode (LED).

The light guiding plate LP is a flat plate-shaped, transparent member having a large refraction index, and has approximately the same size that of each of the first substrate BP1 and the second substrate BP2. Further, the light guiding plate LP is disposed parallel to each of the first substrate BP1 and the second substrate BP2. The light guiding plate LP and the light source LD are adhered to the second substrate BP2 by the transparent adhesion layer OCA, which is formed of an adhesive agent for fixing the light guiding plate LP and the light source LD.

In this embodiment, the first substrate BP1, an electrophoretic layer, the second substrate BP2, the transparent adhesion layer OCA, a pair of the light guiding plate LP and the light source LD, and the covering portion CV are stacked in this order.

Here, the light guiding plate LP is an example of a light guiding portion (a light guiding member) for guiding light emitted from the light source LD. Here, for example, a member having a shape other than the plate shape may be employed as the light guiding plate LP.

Further, the adhesion layer (the transparent adhesive layer OCA in this embodiment) is an example of an adhesion portion including an adhesive agent for allowing the second substrate BP2 and the light guiding plate LP to be adhered and fixed to each other. For example, a member having a shape other than the layer shape may be employed as the transparent adhesive layer OCA. Here, a method other than the method using the adhesive agent may be employed as a method for fixing the second substrate BP2 and the light guiding plate LP and, for example, a method for supporting the light guiding plate LP using a member, such as a frame, may be employed.

Further, the light source LD is an example of a light source for emitting light (a light emitting portion). A light source other than the LED may be employed as the light source LD.

First Configuration Example of Display Panel (Configuration Example Using Partitioning Wall)

Next, the details of the first substrate BP1, the electrophoretic layer, and the second substrate BP2 will be described with reference to FIG. 3.

Figure 3:
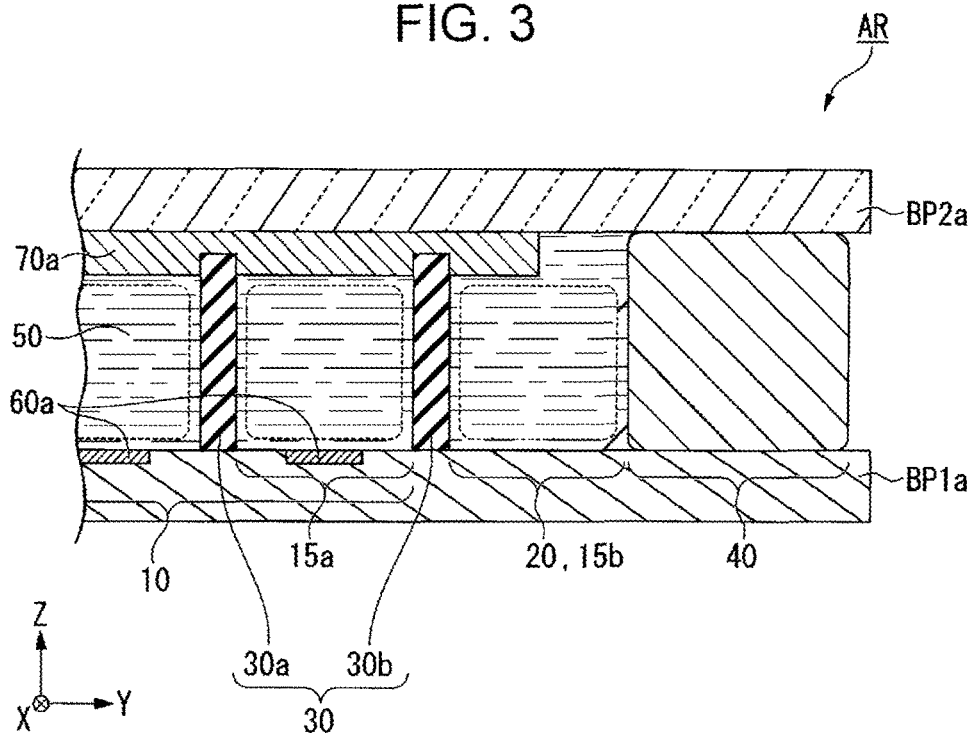
FIG. 3 is a configuration diagram illustrating a first configuration example of the cross-sectional structure and the electric configuration of the display panel, according to the one embodiment of the invention.

FIG. 3 is a configuration diagram illustrating a first configuration example of the cross-sectional structure and the electric configuration of the display panel P1b, according to the one embodiment of the invention.

FIG. 3 is a configuration diagram illustrating an area AR shown in FIG. 2 in detail. As shown in FIGS. 2 and 3, the area AR is an area in which part of a driven area 10 and a non-driven area 20 is included. The driven area 10 and the non-driven area 20 are disposed between a first substrate BP1a (an example of the first substrate BP1) and a second substrate BP2a (an example of the second substrate BP2).

The display panel P1b includes a plurality of partitioning walls between the first substrate BP1a and the second substrate BP2a. In the example shown in FIG. 3, the first substrate BP1a includes a partitioning wall 30a and a partitioning wall 30b. With this configuration, in a layer between the first substrate BP1a and the second substrate BP2a of the display panel P1b, a plurality of areas 15a and an area 15b are partitioned by the partitioning walls 30a and 30b. In the following description, the area 15a and the area 15b will be also collectively referred to as an area 15 unless particularly distinguished from each other. Further, in the following description, the partitioning wall 30a and the partitioning wall 30b will be also collectively referred to as a partitioning wall 30 unless particularly distinguished from each other.

The display panel P1b includes a dispersion liquid 50 between the first substrate BP1a and the second substrate BP2a. The dispersion liquid 50 includes, for example, a dispersion medium, a plurality of white particles, and a plurality of black particles, and is a liquid for dispersing the black particles and the white particles into the area 15. The dispersion liquid 50 is sealed by a sealing portion 40 at the side faces of the display panel P1b. The display panel P1b, according to this embodiment, displays a display image formed by the movements of the black particles and the white particles included in the area 15.

The first substrate BP1a includes a pixel electrode 60a in each of the areas 15a. The second substrate BP2a includes a common electrode 70a across the plurality of areas 15. In this configuration example, a controller (not illustrated) controls, for each of the areas 15, a voltage to be applied to the pixel electrode 60a to allow the white color or the black color to be displayed. Here, a voltage applied to the common electrode 70a may be a constant voltage or may be variably controlled by the controller.

Here, the pixel electrode 60 is not disposed in the area 15b of the display panel P1b. That is, in the area 15a, the display color is changed in accordance with a voltage applied to the pixel electrode 60a, whereas in the area 15b, although part of the common electrode 70a exists, the pixel electrode 60 is not disposed, and thus, the display color is not explicitly changed. For example, in the example shown in FIG. 3, part of the common electrode 70a is disposed in the area 15b. That is, because of the influence of a voltage applied to the common electrode 70a, the area 15b is likely to display an intermediate color, such as a gray color, between the black color and the white color.

In this embodiment, the areas 15b in each of which the display color is changed in accordance with a voltage applied between the common electrode 70a and a corresponding one of the pixel electrodes 60a are handled as the driven area 10. Further, in this embodiment, the area 15b is handled as the non-driven area 20.

Here, in this embodiment, the non-driven area 20 corresponds to, for example, the area 15b located at the periphery of the display panel P1b.

Second Configuration Example of Display Panel (Configuration Example Using Microcapsule)

Figure 4:
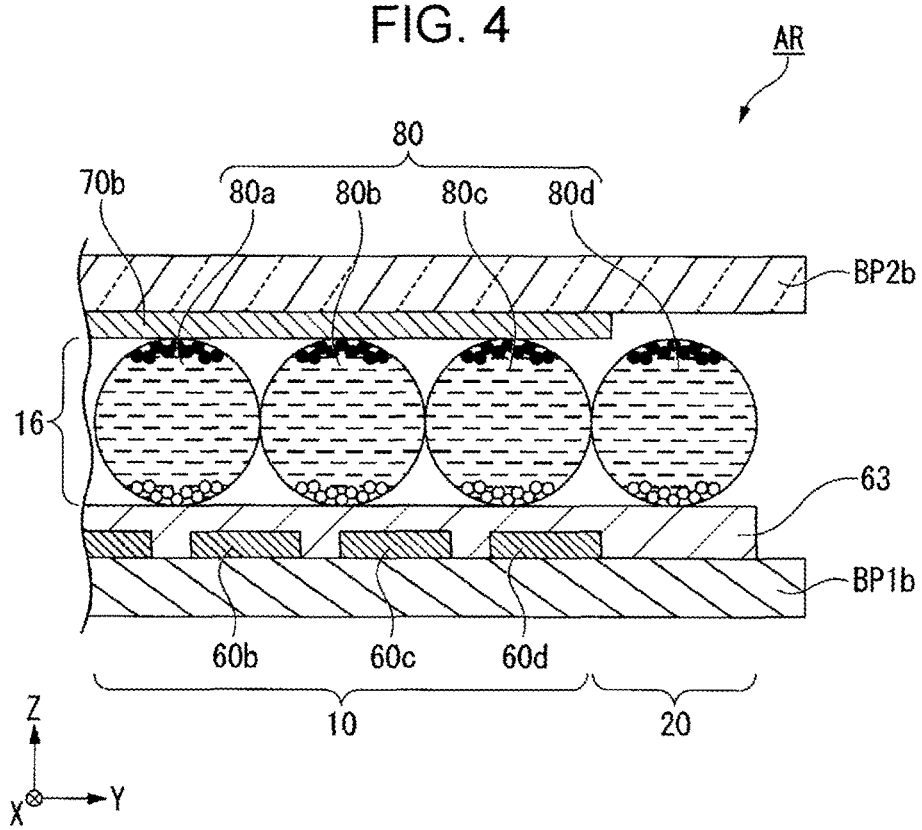
FIG. 4 is a configuration diagram illustrating a second configuration example of the cross-sectional structure and the electric configuration of the display panel, according to the one embodiment of the invention.

FIG. 4 is a configuration diagram illustrating a second configuration example of a cross-sectional structure and an electric configuration of the display panel P1b, according to the one embodiment of the invention. In this configuration example, a case where the display panel P1b is an electrophoretic display device will be described. FIG. 4 is a configuration diagram illustrating the area AR shown in FIG. 2 in detail.

The display panel P1b is configured to interpose an image formation portion 16 (an electrophoretic layer) between a first substrate BP1b (an example of the first substrate BP1) and a second substrate BP2b (an example of the second substrate BP2). A plurality of pixel electrodes 60 are formed at an image formation portion 16 side of the first substrate BP1b. In the example shown in FIG. 4, pixel electrodes 60b, 60c, and 60d are formed at the image formation portion 16 side of the first substrate BP1b. Further, a common electrode 70b is formed at an image formation portion 16 side of the second substrate BP2b.

In the following description, the pixel electrodes 60b, 60c, and 60d (and the pixel electrode 60a shown in FIG. 3) will be also collectively referred to as a pixel electrode 60 unless particularly distinguished from each other.

In this configuration example, a controller (not illustrated) controls, for each of the pixel electrodes 60, a voltage applied to the each pixel electrode 60 to allow the white color or the black color to be displayed. Here, a voltage applied to the common electrode 70b may be a constant voltage or may be variably controlled by the controller.

The image formation portion 16 is, for example, an electrophoretic element in which a plurality of microcapsules 80 each encapsulating the dispersion liquid 50 in its inside are two-dimensionally arrayed. The dispersion liquid 50 is a liquid for dispersing the black particles and the white particles into each of the microcapsules 80. In the example shown in FIG. 4, four microcapsules 80a, 80b, 80c, and 80d are illustrated.

In the description of this embodiment, the microcapsules 80a, 80b, 80c, and 80d will be also collectively referred to as a microcapsule 80 unless particularly distinguished from each other.

In the display panel P1b according to this configuration example, an image formed by the image formation portion 16 is displayed at a side of the second substrate BP2b. Here, the image formation portion 16 may be, instead of the electrophoretic element, any other element capable of changing the colors of the image formation portion 16, such as an element in which a plurality of microcapsules each encapsulating flying powder particles in its inside are two-dimensionally arrayed, by allowing voltages to be applied to the image formation portion 16.

Further, it is typical that the image formation portion 16 is formed at the side of the second substrate BP2b in advance, and is handled as an electrophoretic sheet including a transparent adhesion layer 63. In a production process, the electrophoretic sheet is handled in a state of allowing a protection release sheet to be adhered to the surface of the transparent adhesion layer 63. Further, the display panel P1b is formed by adhering the electrophoretic sheet with its release sheet having been released to the first substrate BP1b having been produced in a different production process and including on itself the pixel electrode 60b and any other component. Thus, the transparent adhesion layer 63 exists at only the side of the pixel electrode 60.

In the example shown in FIG. 4, the pixel electrode 60b, the pixel electrode 60c, and the pixel electrode 60d are respectively disposed adjacent to the microcapsule 80a, the microcapsule 80b, and the microcapsule 80c. In contrast thereto, any one of the pixel electrodes 60 is not disposed adjacent to the microcapsule 80d. That is, the display colors of the microcapsules 80a, 80b, and 80c are changed in accordance with voltages applied to the respective pixel electrodes 60b, 60c, and 60d. In contrast thereto, the display color of the microcapsule 80d is not explicitly changed in accordance with any one of the applied voltages. For example, in the example shown in FIG. 4, with respect to the microcapsule 80d, both of the distance from the pixel electrodes 60d and the distance from the common electrode 70b are large, as compared with the microcapsule 80c. That is, the degree of the influence on the microcapsule 80d by a voltage applied between the pixel electrode 60d and the common electrode 70b is small, as compared with the microcapsule 80c. For this reason, because of a small amount of influence from the pixel electrode 60d and the common electrode 70b, the microcapsule 80d displays an intermediate color, such as a gray color, between the white color and the black color.

In this embodiment, in the image formation portion 16, an area in which the microcapsules 80a, 80b, and 80c each allowing its display color to be changed in accordance with a voltage applied between the common electrode 70b and a corresponding one of the pixel electrodes 60 exists is handled as the driven area 10. Further, in this embodiment, in the image formation portion 16, an area in which the microcapsule 80d whose display color is not explicitly changed in accordance with any one of the voltages applied between the common electrode 70b and the pixel electrodes 60 exists is handled as the non-driven area 20.

Rest of Description of Configuration Example of Display Device

Here, the common electrode 70a shown in FIG. 3 and the common electrode 70b shown in FIG. 4 will be also collectively referred to as a common electrode 70.

The first substrate BP1 is a substrate made of glass, plastic, or any other similar material, and may not necessarily be transparent because the first substrate BP1 is disposed at a side opposite an image display face. The pixel electrodes 60 are electrodes for applying voltages to the respective areas 15 or the image formation portion 16 together with the common electrode 70, and are electrodes each formed of a material resulting from stacking, on a foil made of a copper (Cu) material, a nickel-plated material and a gold-plated material in this order, an aluminum (Al) material, an indium tin oxide (ITO) material, and/or any other material.

Meanwhile, the second substrate BP2 is a substrate made of glass, plastic, or any other similar material, and is a transparent substrate because the second substrate BP2 is disposed at the image display side. The common electrode 70 is an electrode for applying an voltage to the areas 15 or the image formation portion 16 together with the pixel electrode 60, and is a transparent electrode formed of a magnesium silver (MgAg) material, an ITO material, an indium-zinc oxide (IZO) material, and any other material.

Non-limiting examples of the dispersion liquid 50 include water, alcoholic solutions (methanol, ethanol, isopropanol, butanol, octanol, and methyl cellosolve), esters (ethyl acetate and butyl acetate), ketones (acetone, methyl ethyl ketone, and methyl isobutyl ketone), aliphatic hydrocarbons (pentane, hexane, and octane), alicyclic hydrocarbons (cyclohexane and methylcyclohexane), aromatic hydrocarbons (benzene, toluene, benzenes having a long-chain alkyl group (xylene, hexylbenzene, heptylbenzene, octylbenzene, nonylbenzene, decylbenzene, undecylbenzene, dodecylbenzene, tridecylbenzene, and tetradecylbenzene)), halogenated hydrocarbons (methylene chloride, chloroform, carbon tetrachloride, and 1,2-dichloroethane), and carboxylic acid, and other oils may be employed. These materials may be used as a single material or a mixed material, and further, a surface-activating agent may be combined.

The black particles are particles (polymer molecules or colloids) made of a black pigment, such as aniline black or carbon black, and are used, for example, in a state of being positively charged.

The white particles are particles (polymer molecules or colloids) made of a white pigment, such as titanium dioxide, zinc oxide, or antimony trioxide, and are used, for example, in a state of being negatively charged.

With respect to these pigments, a charging control agent made of particles of an electrolyte, a surface-activating agent, metal soap, resin, rubber, oil, vanish, a compound substance, and/or the like, a dispersion agent, such as a titanium coupling agent, an aluminum coupling agent, a silane coupling agent, a lubricant agent, a stabilizing agent, and/or any other addition agent may be added to the pigments as needed.

Further, instead of the black particles and the white particles, for example, a red pigment, a green pigment, a blue pigment, and/or any other colored pigment may be used. This configuration enables the red color, the green color, the blue color, and/or any other color to be displayed on the display panel P1b.

Description of Viewing of Display Device by User

Here, the description is returned to FIG. 2, and viewing of the non-driven area 20 of the display panel P1b by a user will be described. As shown in FIG. 2, when the display device 100 is a watch, there exists a case where a user views the display device 100 in a direction from "6 H" toward "12 H". In the following description, an angle formed by a direction in which a user views the display device 100 and an axis perpendicular to the face of the display panel P1b (i.e., the Z-axis) will be referred to as a viewing angle θi. Here, as shown in FIG. 2, the face of the display panel P1b is a horizontal face parallel to an X-Y plane.

Refraction Index in Configuration of Display Panel

The relationship between the configuration of the display panel P1b and the viewing angle θi will be described with reference to FIG. 5.

Figure 5:
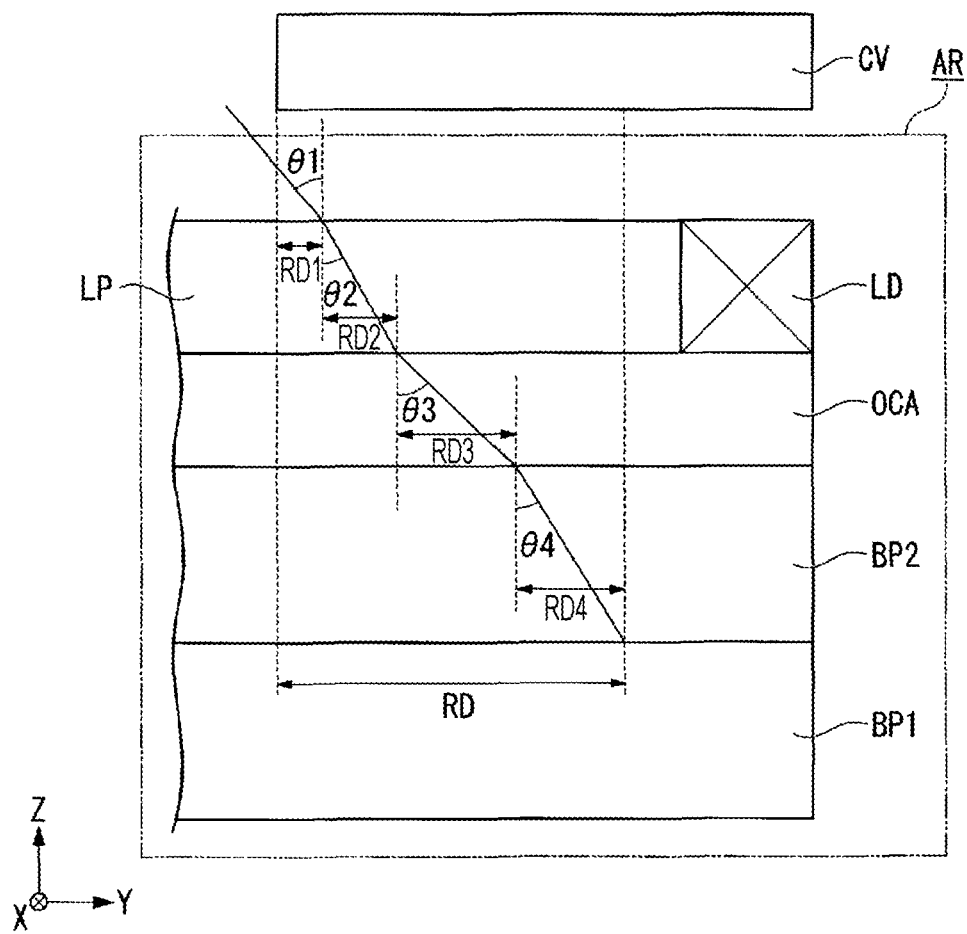
FIG. 5 is a diagram illustrating an example of the configuration and refraction indexes of the display panel, according to the one embodiment of the invention.

FIG. 5 is a diagram illustrating an example of the configuration and refraction indexes of the display panel P1b, according to the one embodiment of the invention. FIG. 5 is a configuration diagram illustrating in detail the area AR shown in FIG. 2 and the covering portion CV shown in FIG. 2 and corresponding to the position of the area AR. Specifically, FIG. 5 is a configuration diagram illustrating an end portion in a direction toward "12 H" of the display panel P1b.

In the example shown in FIG. 5, the covering portion CV and the light guiding plate LP are disposed so as to interpose a space (an air layer) having a thickness of 0.1 millimeters therebetween. Further, in this example, a PC material having a refraction index of 1.57 and a thickness of 0.1 millimeters is used as the light guiding plate LP. Further, in this example, the transparent adhesion layer OCA, which is an acrylic material having an refraction index of 1.47, is applied to the second substrate BP2 by only a thickness of 0.1 millimeters to allow the light source LD and the second substrate BP2 to be adhered to each other. Further, in this example, a glass substrate having a refraction index of 1.52 and a thickness of 0.5 millimeters is used as the second substrate BP2.

Here, the relationship between the refraction index and the incidence angle with respect to a pre-incidence material and the refraction index and the emission angle with respect to a post-incidence material is represented by a formula (1).

$$\theta_B = \sin^{-1}\left(\frac{n_A}{n_B}\sin\theta_A\right) \quad (1)$$

Here, "$n_A$" included in the formula (1) denotes the refraction index of the pre-incidence material. Further, "$n_B$" denotes the refraction index of the post-incidence material. Further, "$\theta_A$" denotes the incidence angle of light incident from the pre-incidence material. Further, "$\theta_B$" denotes the emission angle of light emitted into the post-incidence material.

As shown in FIG. 5, a visibility secured distance RD is a distance from a position corresponding to one end of the opening portion of the covering portion CV to a position where the display panel P1b covered by the covering portion CV is visible when the display panel P1b is viewed at an angle θ1.

Hereinafter, the visibility secured distance RD in this example will be described in detail.

When a distance needed for light incident at the angle θ1 from one end of the covering portion CV to reach the light guiding plate LP is denoted by a distance RD1, this distance RD1 is calculated from the angle θ1 and the thickness of the air layer. Further, when an emission angle of light emitted into the light guiding plate LP is denoted by an angle θ2, this angle θ2 is calculated on the basis of the angle θ1, the refraction index of the air, the refraction index of the light guiding plate LP, and the formula (1).

When a distance needed for light emitted at the angle θ2 into the light guiding plate LP to reach the transparent adhesion layer OCA is denoted by a distance RD2, this RD2 is calculated from the angle θ2 and the thickness of the light guiding plate LP. Further, when an emission angle of light emitted into the transparent adhesion layer OCA is denoted by an angle θ3, this angle θ3 is calculated on the basis of the angle θ2, the refraction index of the light guiding plate LP, the refraction index of the transparent adhesion layer OCA, and the formula (1).

When a distance needed for light emitted at the angle θ3 into the transparent adhesion layer OCA to reach the second substrate BP2 is denoted by a distance RD3, this RD3 is calculated from the angle θ3 and the thickness of the transparent adhesion layer OCA. Further, when an emission angle of light emitted into the second substrate BP2 is denoted by an angle θ4, this angle θ4 is calculated on the basis of the angle θ3, the refraction index of the transparent adhesion layer OCA, the refraction index of the second substrate BP2, and the formula (1).

When a distance needed for light emitted at the angle θ4 into the second substrate BP2 to reach the first substrate BP1 is denoted by a distance RD4, this RD4 is calculated from the angle θ4 and the thickness of the second substrate BP2.

That is, the visibility secured distance RD is the sum of the distances RD1, RD2, RD3, and RD4.

In this example, a case where the angle θ1 shown in FIG. 5 is a viewing angle θi will be described.

Viewing Angle of Non-Driven Area

The relationship between the display panel P1b provided in this example and the viewing angle θi will be described with reference to FIG. 6.

FIG. 6 is a graph illustrating an example of the relationship between the visibility secured distance RD and the viewing angle θi according to the one embodiment of the invention.

In FIG. 6, a curve WPD based on the formula (1) and the refraction indexes of the individual portions of the display panel P1b in this example is illustrated and indicates the relationship between the visibility secured distance RD and the viewing angle θi. In this example, it is shown that, when the viewing angle θi is equal to 0 degrees, the display device 100 is viewed in the negative Z-axis direction. Further, in this example, it is shown that, when the viewing angle θi is equal to 90 degrees, the display device 100 is viewed in the positive Y-axis direction.

Further, in this example, the length of an attention-paid side (the radius in the case of a circle) of the display panel P1b in FIG. 6 is longer than the length of a corresponding side (the radius in the case of a circle) of the opening portion included in the covering portion CV by a length of 2.5 millimeters. Here, in this example, a range of 1.4 millimeters from the end of an outer peripheral portion of the display panel P1b corresponds to the non-driven area 20. That is, an inner peripheral portion, that is, a range of 1.1 millimeters from the end of the inner periphery of the display panel P1b, corresponds to the driven area 10.

First, the disposition of the display panel P1a according to the comparison example will be described with reference to FIG. 1. In this comparison example, the shape, the layer configuration, the electric configuration, the range of the driven area, and the range of the non-driven area with respect to the display panel P1a are assumed to be the same as those with respect to the display panel P1b. Further, the figure center of the display panel P1a is assumed to be disposed at the same position as the position of the covering-portion shape figure center CFC.

Here, the description is returned to FIG. 6. In FIG. 6, a threshold line WL1 is indicated at a position at which the visibility secured distance RD is 0.6 millimeters. This means that the driven area 10 included in the display panel P1a corresponds to a range of 0.6 millimeters from the end of the opening portion of the covering portion CV. That is, in the case of the display panel P1a, the threshold line WL1 is information indicating a threshold value of a distance at which the visibility of the driven area 10 is secured. That is, as shown in FIG. 6, in the case of the display panel P1a, the surrounding of the inner peripheral portion, that is, the driven area 10, is covered by the covering portion CV. As shown in FIG. 6, when the viewing angle θi is smaller than approximately 45 degrees, the non-driven area 20 included in the outer peripheral portion constituting the display panel P1a and covered by the covering portion CV is not viewed. That is, in the display panel P1a, when the viewing angle θi is equal to approximately 45 degrees, the curve WPD crosses the threshold line WL1. Thus, in the display panel P1a, when the viewing angle θi is larger than or equal to approximately 45 degrees, the non-driven area 20 is viewed.

Next, the disposition of the display panel P1b according to this example will be described.

In FIG. 6, a threshold line WL2 is illustrated at a position at which the visibility secured distance RD is 1.1 millimeters. This means that the driven area 10 included in the display panel P1*b* corresponds to the inner range, that is, the range of 0.6 millimeters, and further, the driven area 10 of the display panel P1*b* is disposed up to a position shifted by a distance equivalent to the length d (0.5 millimeters in this example) from the above state in a direction toward "12 H". That is, in the case of the display panel P1*b*, the threshold line WL2 is information indicating a threshold value of a distance at which the visibility of the driven area 10 is secured. That is, as shown in FIG. 6, in the case of the display panel P1*b*, the surrounding of the inner portion, that is, the driven area 10, is covered by the covering portion CV, and further, the inner portion, that is, the driven area 10, is disposed up to a position shifted by a distance equivalent to the length d from the above state. With this configuration, as shown in FIG. 6, when the viewing angle θi is smaller than approximately 70 degrees, the non-driven area 20, which is included in the outer portion constituting the display panel P1*b* and covered by the covering portion CV, is not viewed. That is, in the display panel P1*b*, when the viewing angle θi is equal to approximately 70 degrees, the curve WPD crosses the threshold line WL2. That is, in the display panel P1*b*, when the viewing angle θi is larger than or equal to approximately 70 degrees, the non-driven area 20 is viewed.

As described above, in the display panel P1*b* according to this embodiment, when viewed in a direction from "6 H" toward "12 H", a viewing angle θi at which the non-driven area 20 is viewed is large, as compared with the display panel P1*a* according to the comparison example.

Shift Direction of Display Panel

The description is returned to FIG. 1, and the disposition of the display panel P1*b* will be described. Here, for the convenience of description, the disposition of the display panel P1*b* will be described in a comparison with the comparison example.

As described above, when the display device 100 is a watch, there is a case where a user views the display device 100 in a direction from "6 H" toward "12 H". Thus, in this embodiment, the display shape figure center CFPb of the display panel P1*b* is disposed at a position that differs by a distance equivalent to the length d in a direction from the center of the covering-portion shape figure center CFC toward "12 H". In the example shown in FIG. 1, the display shape figure center CFPb, which is the figure center of the display panel P1*b*, is disposed at a position distanced from the covering-portion shape figure center CFC by a distance equivalent to the length d in the positive Y-axis direction. In this example, the length d is assumed to be 0.5 millimeters.

First, as shown in FIG. 1, in the case of the display panel P1*a*, the length of a portion where part of the display panel P1*a* is covered by the covering portion CV in a direction toward "12 H" is denoted by a first covered length CPDa1. Further, in the case of the display panel P1*a*, the length of a portion where part of the display panel P1*a* is covered by the covering portion CV in a direction toward "6 H" is denoted by a second covered length CPDa2.

As described above, the covering portion CV and the display panel P1*a* have mutually similar shapes. Further, as described above, the covering-portion shape figure center CFC of the covering portion CV and the display shape figure center CFPa of the display panel P1*a* are disposed at the same position. It follows from these configurations that the first covering length CPDa1 and the second covered length CPDa2 are the same length. In this example, each of the first covered length CPDa1 and the second covered length CPDa2 is assumed to be equal to 2.0 millimeters.

Meanwhile, in the case of the display panel P1*b*, as shown in FIG. 1, the length of a portion where part of the display panel P1*b* is covered by the covering portion CV in the direction toward "12 H" is denoted by a first covered length CPDb1. Further, in the case of the display panel P1*b*, the length of a portion where part of the display panel P1*b* is covered by the covering portion CV in the direction toward "6 H" is denoted by a second covered length CPDb2.

As described above, in this example, the position of the display shape figure center CFPb is different from the position of the display shape figure center CFPa by a distance equivalent to the length d in a Y-axis direction toward "12 H". With this configuration, as compared with a state in which the first covered length CPDa1 and the second covered length CPDa2 are the same length (i.e., the state in the comparison example), in this embodiment, the first covered length CPDb1 is longer than the second covered length CPDb2.

In this embodiment, when the first straight line L1 and the second straight line L2 are viewed from a predetermined direction side (a first direction side), the first straight line L1 and the second straight line L2 are disposed so as to be in parallel to each other on a plane, and when this plane is viewed in a plan view, the driven area 10 of the display panel P1*b* is symmetric relative to the first straight line L1, which passes on the figure center of the driven area 10 (this figure center being the display shape figure center CFPb in this embodiment). Further, in this embodiment, when the plane, on which the first straight line L1 and the second straight line L2 are disposed so as to be in parallel to each other when viewed from the first direction side, is viewed in a plan view, the opening portion of the covering portion CV is symmetric relative to the second straight line L2, which passes on the figure center of the opening portion (this figure center being the covering-portion shape figure center CFC in this embodiment). Further, when the plane, on which the first straight line L1 and the second straight line L2 are disposed so as to be in parallel to each other when viewed from the first direction side, is viewed in a plan view, one side portion and the other side portion that are included in the driven area 10 and covered by the covering portion CV and that are located opposite each other with the first straight line L1 located therebetween have mutually different lengths in a direction perpendicular to the first straight line. Here, in this embodiment, the face of the driven area 10 of the display panel P1*b* (here, the face being a face parallel to the X-Y plane) and the face of the opening portion of the covering portion CY (here, the face being a face parallel to the X-Y plane) are parallel (or approximately parallel) to each other, and the first direction is a direction perpendicular to these faces (here, the direction being the Z-axis direction). In this embodiment, the first direction is a direction perpendicular to the clock time display face of the watch.

In this embodiment, the first covered length CPDb1 is equal to 2.5 millimeters resulting from adding 2.0 millimeters, the first covered length CPDa1, to 0.5 millimeters, the shift length d. Further, the second covered length CPDb2 is equal to 1.5 millimeters resulting from subtracting 0.5 millimeters, the shift length d, from 2.0 millimeters, the second covered length CPDa2. Here, in this embodiment, it is assumed that a range of the peripheral portion of the display panel P1*b*, that is, a range of the non-driven area 20, has a length of 1.4 millimeters. That is, the difference between 1.5 millimeters, the length of the second covered length CPDb2, and 1.4 millimeters, and the range of the peripheral portion, that is, the range of the non-driven area 20, is 0.1 millimeters. With this configuration, even when the display device 100 is viewed in the positive Z-axis direction, the non-driven area 20 at the "6 H" direction side is not viewed because there is a margin of 0.1 millimeters in a direction outward from the opening portion of the covering portion CV.

In this way, in the display panel P1b according to this embodiment, as compared with the display panel P1a according to the comparison example, with respect to the portion covered by the covering portion CV, the lengths of one portion and the other portion of the portion covered by the covering portion CV in the Y-axis direction are different from each other. That is, the first covered length CPDb1 and the second covered length CPDb2 are lengths different from each other.

Thus, the display panel P1b of the display device 100 according to this embodiment is configured to, when the display device 100 is viewed in the direction from "6 H" toward "12 H", allow the non-driven area 20 to be hard to be viewed. This configuration improves the quality of display in the display device 100 according to this embodiment. Further, this configuration is effective particularly in a case where the guiding plate LP is provided just like the display panel P1b according to this embodiment.

Further, in this embodiment, the above effects are obtained without, for example, changing the size of the display panel P1b or increasing the size of the driven area 10 of the display panel P1b. Further, this embodiment needs no additional component, as compared with, for example, the comparison example.

Here, in this embodiment, the display panel P1b is configured to allow its figure center to be shifted from the figure center of the covering portion CV in the direction from "6 H" toward "12 H" on the watch, but may be configured to allow its figure center to be shifted in a different direction.

Further, in the display device 100 according to this example, the configuration in which the light source LD is disposed as a front light has been described, but a different configuration may be employed. Non-limiting examples of such a different configuration include a configuration in which a back light is provided instead of the front light, and a configuration in which outside light is used instead of the front light and the back light.

Further, in the display device 100 according to this embodiment, the configuration in which the light source LD and the light guiding plate LP are included has been described, but the configuration of the display device 100 is not limited to this configuration. The display device 100 may be configured so as not to include the light source LD and the light guiding plate LP, and in such a configuration, the transparent adhesion layer OCA may not be applied onto the second substrate BP2. In such a configuration in which the light source LD and the light guiding plate LP are not provided, the same effects as those having been described above are obtained in this embodiment.

Further, in this embodiment, the covering portion CV is constituted by one unified member, but may be constituted by a plurality of portions (members) combined with one another as a different configuration example.

Further, in this embodiment, since the figure center of the driven area of the display panel P1b is shifted from the figure center of the opening portion of the covering portion CV, the controller (not illustrated) controls display content so as to allow the display content to be appropriately displayed within an area constituting the driven area and being visible through the opening portion of the covering portion CV.

Further, the display device 100 may be configured to include an adjustment portion for adjusting the shift of the figure center of the driven area of the display panel P1b from the figure center of the opening portion of the covering portion CV on the basis of an operation by a user.

Other Examples of Shape of Display Device 100

Here, other examples of the shape of the display device 100 will be described.

In the example shown in FIG. 1, a configuration in which the display device 100 has a quadrangular shape has been described, but the configuration of the display device 100 is not limited to this configuration.

Shape of Display Device: Circular Shape

FIG. 7 is a configuration diagram illustrating an outline configuration of a display device 110 according to the one embodiment of the invention. FIG. 7 is a plan view of the display device 110. The display device 110 includes a covering portion CV11 and a display panel P11b. As shown in FIG. 7, the covering portion CV11 is disposed at a position covering the display panel P11b, and the outer circumference of the display panel P11b is covered by a portion other than an opening portion of the covering portion CV11 in the covering portion CV11.

In FIG. 7, a covering-portion shape figure center CFD1 is illustrated, and this covering-portion shape figure center CFD1 is the figure center of the shape of the opening portion of the covering portion CV11. In this example, a display shape figure center CFPb1, that is, the figure center of the display panel P11b, is disposed at a position shifted (distanced) from the position of the covering-portion shape figure center in the Y-axis direction by a distance equivalent to a length d1.

Further, in this example, as shown in FIG. 7, the shape of the display panel P1b is symmetric relative to a first straight line L11 passing on the display shape figure center CFPb1. Further, in this example, the shape of the opening portion included in the covering portion CV11 is symmetric relative to a second straight line L21 passing on the covering-portion shape figure center CFD1. Further, in this example, the first straight line L11 and the second straight line L21 are lines parallel to the X-axis.

Here, in this example, a case where the display panel P11b and the covering portion CV11, which are included in the display device 110, have circular shapes will be described. Further, in this example, the display panel P11b and the covering portion CV11, which are included in the display device 110, have mutually similar shapes.

Here, in FIG. 7, the position of a display panel P11a is illustrated. This display panel P11a is a comparison example. The display panel P11a has the same configuration as that of the display panel P11b. Specifically, the shape, the layer structure, the electric configuration, the range of the driven area, and the range of the non-driven area with respect to the display panel P11a are the same as those with respect to the display panel P11b. Further, as shown in FIG. 7, the display shape figure center CFPa1, which is the figure center of the display panel P11a, and the covering-portion shape figure center CFD1 are disposed at the same position.

First, in the case of the display panel P11a according to the comparison example, the length of a portion where part of the display panel P1a is covered by the covering portion CV11 in the direction toward "12 H" is denoted by a first covered length CPDa11. Further, in the case of the display panel P11a, the length of a portion where part of the display panel P11a is covered by the covering portion CV11 in the direction toward "6 H" is denoted by a second covered length CPDa21. Here, the first covered length CPDa11 and the second covered length CPDa21 are the same length.

Meanwhile, in the case of the display panel P11b according to this example, the length of a portion where part of the display panel P11*b* is covered by the covering portion CV11 in the direction toward "12 H" is denoted by a first covered length CPDb11. Further, in the case of the display panel P11*b*, the length of a portion where part of the display panel P11*b* is covered by the covering portion CV11 in the direction toward "6 H" is denoted by a second covered length CPDb21. Here, the first covered length CPDb11 is longer than the second covered length CPDb21.

In this example, when the first straight line L11 and the second straight line L21 are viewed from a predetermined direction side (a first direction side), the first straight line L11 and the second straight line L21 are disposed so as to be in parallel to each other on a plane, and when this plane is viewed in a plan view, the driven area 10 of the display panel P11*b* is symmetric relative to the first straight line L11, which passes on the figure center of the driven area 10 (this figure center being the display shape figure center CFPb1 in this example). Further, in this example, when the plane, on which the first straight line L11 and the second straight line L21 are disposed so as to be in parallel to each other when viewed from the first direction side, is viewed in a plan view, the opening portion of the covering portion CV11 is symmetric relative to the second straight line L21, which passes on the figure center of the opening portion (this figure center being the covering-portion shape figure center CFD1 in this example). Further, when the plane, on which the first straight line L11 and the second straight line L21 are disposed so as to be in parallel to each other when viewed from the first direction side, is viewed in a plan view, one side portion and the other side portion that are included in the driven area 10 and covered by the covering portion CV and that are located opposite each other with the first straight line L11 located therebetween have mutually different lengths in a direction perpendicular to the first straight line L11. Here, in this embodiment, the face of the driven area 10 of the display panel P11*b* (here, this face being a face parallel to the X-Y plane) and the face of the opening portion of the covering portion CV11 (here, this face being a face parallel to the X-Y plane) are parallel (or approximately parallel) to each other, and the first direction is a direction perpendicular to these faces (here, this direction being the Z-axis direction). In this embodiment, the first direction is a direction perpendicular to the clock time display face of the watch.

In this way, the display panel P11*b* of the display device 110 according to this example is configured to, when the display device 110 is viewed in the direction from "6 H" toward "12 H", allow the non-driven area 20 to be hard to be viewed. This configuration improves the quality of display in the display device 110 according to this embodiment.

Shape of Display Device: Elliptical Shape

FIG. 8 is a configuration diagram illustrating an outline configuration of a display device 120 according to the one embodiment of the invention. FIG. 8 is a plan view of the display device 120. The display device 120 includes a covering portion CV12 and a display panel P12*b*. As shown in FIG. 8, the covering portion CV12 is disposed at a position covering the display panel P12*b*, and the periphery of the display panel P12*b* is covered by a portion other than an opening portion of the covering portion CV12 in the covering portion CV12.

In FIG. 8, a covering-portion shape figure center CFD2 is illustrated, and this covering-portion shape figure center CFD2 is the figure center of the shape of the opening portion of the covering portion CV12. In this example, a display shape figure center CFPb2, that is, the figure center of the display panel P12*b*, is disposed at a position shifted (distanced) from the position of the covering-portion shape figure center CFD2 in the Y-axis direction by a distance equivalent to a length d2.

Further, in this example, as shown in FIG. 8, the shape of the display panel P12*b* is symmetric relative to a first straight line L12 passing on the display shape figure center CFPb2. Further, in this example, as shown in FIG. 8, the shape of the opening portion included in the covering portion CV12 is symmetric relative to a second straight line L22 passing on the covering-portion shape figure center CFD2. Further, in this example, as shown in FIG. 8, the first straight line L12 and the second straight line L22 are lines parallel to the X-axis.

Here, in this example, a case where the display panel P12*b* and the covering portion CV12, which are included in the display device 120, have elliptical shapes will be described. Further, in this example, the display panel P12*b* and the covering portion CV12, which are included in the display device 120, have mutually similar shapes.

Here, in FIG. 8, the position of a display panel P12*a* is illustrated, and this display panel P12*a* is a comparison example. The display panel P12*a* has the same configuration as that of the display panel P12*b*. Specifically, the shape, the layer structure, the electric configuration, the range of the driven area, and the range of the non-driven area with respect to the display panel P12*a* are the same as those with respect to the display panel P12*b*. Further, as shown in FIG. 8, the display shape figure center CFPa2, which is the figure center of the display panel P12*a*, and the covering-portion shape figure center CFD2 are disposed at the same position.

First, in the case of the display panel P12*a* according to the comparison example, the length of a portion where part of the display panel P12*a* is covered by the covering portion CV12 in the direction toward "12 H" is denoted by a first covered length CPDa12. Further, in the case of the display panel P12*a*, the length of a portion where part of the display panel P12*a* is covered by the covering portion CV12 in the direction toward "6 H" is denoted by a second covered length CPDa22. Here, the first covered length CPDa12 and the second covered length CPDa22 are the same length.

Meanwhile, in the case of the display panel P12*b* according to this example, the length of a portion where part of the display panel P12*b* is covered by the covering portion CV12 in the direction toward "12 H" is denoted by a first covered length CPDb12. Further, in the case of the display panel P12*b*, the length of a portion where part of the display panel P12*b* is covered by the covering portion CV12 in the direction toward "6 H" is denoted by a second covered length CPDb22. Here, the first covered length CPDb12 is longer than the second covered length CPDb22.

In this example, when the first straight line L12 and the second straight line L22 are viewed from a predetermined direction side (a first direction side), the first straight line L12 and the second straight line L22 are disposed so as to be in parallel to each other on a plane, and when this plane is viewed in a plan view, the driven area 10 of the display panel P12*b* is symmetric relative to the first straight line L12, which passes on the figure center of the driven area 10 (this figure center being the display shape figure center CFPb2 in this example). Further, in this example, when the plane, on which the first straight line L12 and the second straight line L22 are disposed so as to be in parallel to each other when viewed from the first direction side, is viewed in a plan view, the opening portion of the covering portion CV12 is symmetric relative to the second straight line L22, which passes on the figure center of the opening portion (this figure center being the covering-portion shape figure center CFD2 in this example). Further, when the plane, on which the first straight line L12 and the second straight line L22 are disposed so as to be in parallel to each other when viewed from the first direction side, is viewed in a plan view, one side portion and the other side portion that are included in the driven area 10 and covered by the covering portion CV12 and that are located opposite each other with the first straight line L12 located therebetween have mutually different lengths in a direction perpendicular to the first straight line L12. Here, in this embodiment, the face of the driven area 10 of the display panel P12b (here, this face being a face parallel to the X-Y plane) and the face of the opening portion of the covering portion CV12 (here, this face being a face parallel to the X-Y plane) are parallel (or approximately parallel) to each other, and the first direction is a direction perpendicular to these faces (here, this direction being the Z-axis direction). In this embodiment, the first direction is a direction perpendicular to the clock time display face of the watch.

In this way, the display panel P12b of the display device 120 according to this example is configured to, when the display device 120 is viewed in the direction from "6 H" toward "12 H", allow the non-driven area 20 to be hard to be viewed. This configuration improves the quality of display in the display device 120 according to this embodiment.

Shape of Display Device: Hexagonal Shape

FIG. 9 is a configuration diagram illustrating an outline configuration of a display device 130 according to the one embodiment of the invention. FIG. 9 is a plan view of the display device 130. The display device 130 includes a covering portion CV13 and a display panel P13b. As shown in FIG. 9, the covering portion CV13 is disposed at a position covering the display panel P13b, and the periphery of the display panel P13b is covered by a portion other than an opening portion of the covering portion CV13 in the covering portion CV13.

In FIG. 9, a covering-portion shape figure center CFD3 is illustrated, and this covering-portion shape figure center CFD3 is the figure center of the shape of the opening portion of the covering portion CV13. In this example, a display shape figure center CFPb3, that is, the figure center of the display panel P13b, is disposed at a position shifted (distanced) from the position of the covering-portion shape figure center CFD3 in the Y-axis direction by a distance equivalent to a length d3.

Further, in this example, as shown in FIG. 9, the shape of the display panel P13b is symmetric relative to a first straight line L13 passing on the display shape figure center CFPb3. Further, in this example, as shown in FIG. 9, the shape of the opening portion included in the covering portion CV13 is symmetric relative to a second straight line L23 passing on the covering-portion shape figure center CFD3. Further, in this example, as shown in FIG. 9, the first straight line L13 and the second straight line L23 are lines parallel to the X-axis.

Here, in this example, as shown in FIG. 9, a case where the display panel P13b and the covering portion CV13, which are included in the display device 130, have hexagonal shapes will be described. Further, in this example, as shown in FIG. 9, the display panel P13b and the covering portion CV13, which are included in the display device 130, have mutually similar shapes.

Here, in FIG. 9, the position of a display panel P13a is illustrated, and this display panel P13a is a comparison example. The display panel P13a has the same configuration as that of the display panel P13b. Specifically, the shape, the layer structure, the electric configuration, the range of the driven area 10, and the range of the non-driven area 20 with respect to the display panel P13a are the same as those with respect to the display panel P13b. Further, as shown in FIG. 9, the display shape figure center CFPa3, which is the figure center of the display panel P13a, and the covering-portion shape figure center CFD3 are disposed at the same position.

First, in the case of the display panel P13a according to the comparison example, the length of a portion where part of the display panel P13a is covered by the covering portion CV13 in the direction toward "12 H" is denoted by a first covered length CPDa13. Further, in the case of the display panel P13a, the length of a portion where part of the display panel P13a is covered by the covering portion CV13 in the direction toward "6 H" is denoted by a second covered length CPDa23. Here, the first covered length CPDa13 and the second covered length CPDa23 are the same length.

Meanwhile, in the case of the display panel P13b according to this example, the length of a portion where part of the display panel P13b is covered by the covering portion CV13 in the direction toward "12 H" is denoted by a first covered length CPDb13. Further, in the case of the display panel P13b, the length of a portion where part of the display panel P13b is covered by the covering portion CV13 in the direction toward "6 H" is denoted by a second covered length CPDb23. Here, the first covered length CPDb13 is longer than the second covered length CPDb23.

In this example, when the first straight line L13 and the second straight line L23 are viewed from a predetermined direction side (a first direction side), the first straight line L13 and the second straight line L23 are disposed so as to be in parallel to each other on a plane, and when this plane is viewed in a plan view, the driven area 10 of the display panel P13b is symmetric relative to the first straight line L13, which passes on the figure center of the driven area 10 (this figure center being the display shape figure center CFPb3 in this example). Further, in this example, when the plane, on which the first straight line L13 and the second straight line L23 are disposed so as to be in parallel to each other when viewed from the first direction side, is viewed in a plan view, the opening portion of the covering portion CV13 is symmetric relative to the second straight line L23, which passes on the figure center of the opening portion (this figure center being the covering-portion shape figure center CFD3 in this example). Further, when the plane, on which the first straight line L13 and the second straight line L23 are disposed so as to be in parallel to each other when viewed from the first direction side, is viewed in a plan view, one side portion and the other side portion that are included in the driven area 10 and covered by the covering portion CV13 and that are located opposite each other with the first straight line L13 located therebetween have mutually different lengths in a direction perpendicular to the first straight line L13. Here, in this embodiment, the face of the driven area 10 of the display panel P13b (here, this face being a face parallel to the X-Y plane) and the face of the opening portion of the covering portion CV13 (here, this face being a face parallel to the X-Y plane) are parallel (or approximately parallel) to each other, and the first direction is a direction perpendicular to these faces (here, this direction being the Z-axis direction). In this embodiment, the first direction is a direction perpendicular to the clock time display face of the watch.

In this way, the display panel P13b of the display device 130 according to this example is configured to, when the display device 130 is viewed in the direction from "6 H" toward "12 H", allow the non-driven area 20 to be hard to be viewed. This configuration improves the quality of display in the display device 130 according to this embodiment.

Shape of Display Device: Chamfering

Figure 10:
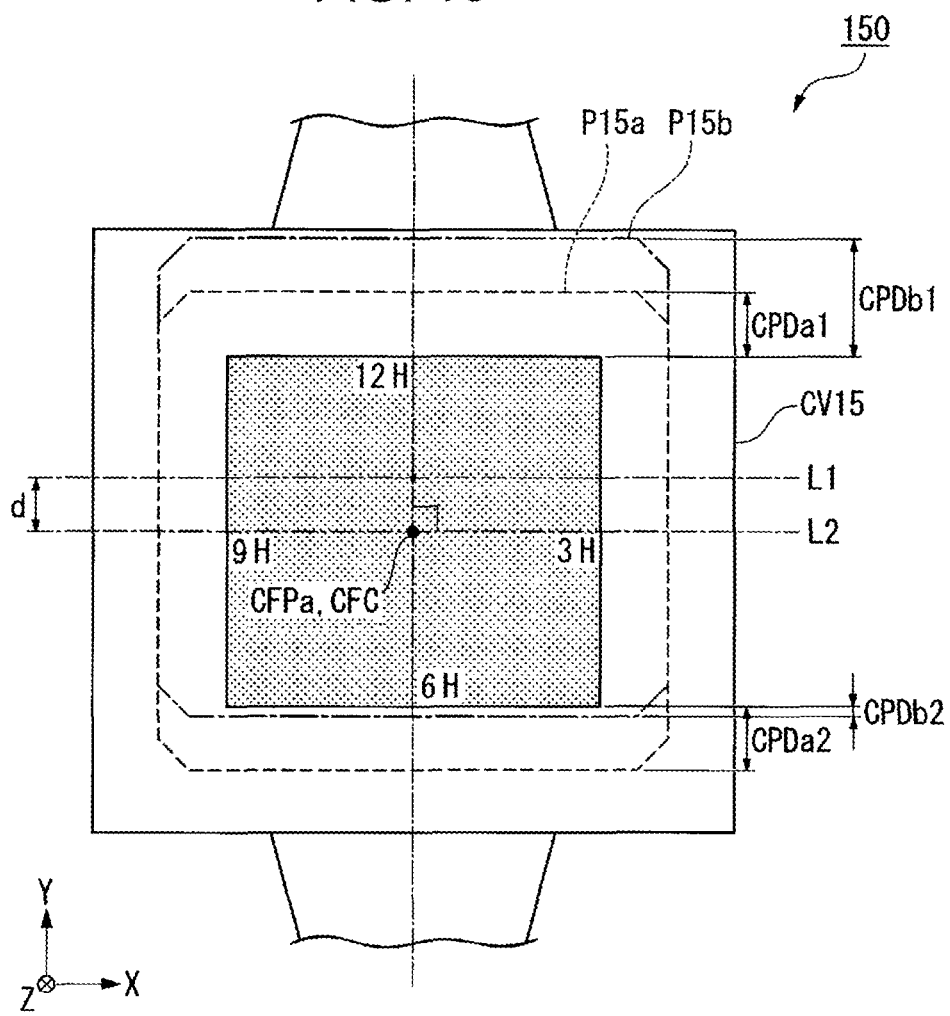
FIG. 10 is a configuration diagram illustrating an outline configuration of a display device according to the one embodiment of the invention.

FIG. 10 is a configuration diagram illustrating an outline configuration of a display device 150 according to the one embodiment of the invention. FIG. 10 is a plan view of the display device 150. The display device 150 includes a covering portion CV15 and a display panel P15b. Further, the position of a display panel P15a is illustrated, and this display panel 15a is a comparison example.

Here, the configuration of the display device 150 according to the example shown in FIG. 10 is different from the configuration of the display device 100 according to the example shown in FIG. 1 in that, in each of a covering portion CV15 and the display panel P15b, the four corners of its quadrangular shape are chamfered (cut down), and the configuration of the display device 150 is the same as the configuration of the display device 100 in the other respects. Here, in the example shown in FIG. 10, constituent portions similar to the constituent portions in the example shown in FIG. 1 are denoted by reference signs identical to the reference signs of the constituent portions in the example shown in FIG. 1.

In this way, in this embodiment, for one or both of the covering portion CV15 and the display panel P15b, corners and/or any other portion of the shape of the face thereof may be chamfered.

It should be noted that, although, in this embodiment, a configuration in which all corners of a polygon, such as a quadrilateral, are chamfered is shown, a configuration in which only two adjacent corners of four corners of a quadrilateral are chamfered, a configuration in which only three adjacent corners of six corners of a hexagon are chamfered, or any other similar configuration may be employed as a different configuration example.

Further, in this embodiment, because of a design reason and the like, a configuration in which only one corner of four corners of a quadrilateral is chamfered, a configuration in which only two adjacent corners of six corners of a hexagon are chamfered, or any other similar configuration may be employed. In such configurations, in a respect that the lengths of one side portion and the other side portion that are included in the driven area 10 and covered by the covering portion CV15 and that are located opposite each other with the first straight line L1 located therebetween are made different from each other in a direction perpendicular to the first straight line L1 so as to bring about an effect of allowing the non-driven area 20 to be hard to be viewed, there are also cases where it can be substantially said that the driven area 10 of the display panel P1b is symmetric relative to the first straight line L1 and/or the opening portion of the covering portion CV is symmetric relative to the second straight line L2. That is, the symmetry of each of these portions may include approximately symmetry which is substantially symmetry and in which the shape is broken to a certain degree because of a design reason and the like.

It should be noted that, although, heretofore, a case where the display panel and the covering portion have mutually similar shapes has been described, the configuration of the display device is not limited to this configuration. For example, the display panel and the covering portion may not have mutually similar shapes. As one example thereof, the configuration may be made such that the display panel has a circular shape and the covering portion has a quadrangular shape, and moreover, the configuration may be made in a further different way.

Second Embodiment

Figure 11:
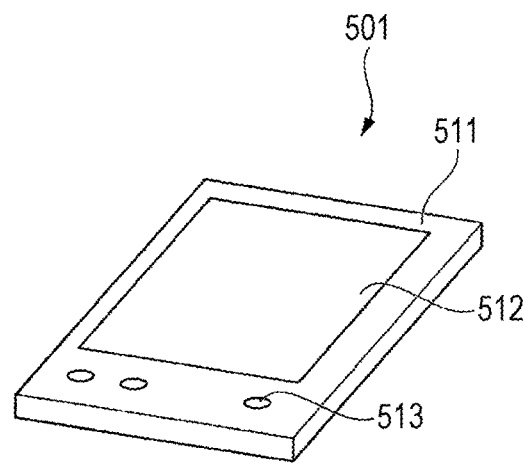
FIG. 11 is a perspective view of an electronic book, an example of electronic devices according to one embodiment (a second embodiment) of the invention.
Figure 12:
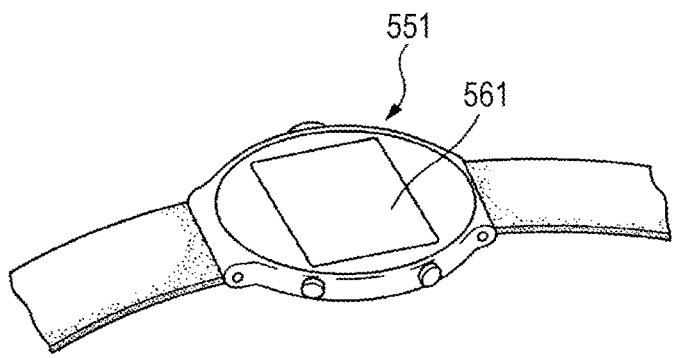
FIG. 12 is a perspective view of a watch, an example of electronic devices according to the one embodiment (the second aspect) of the invention.
Figure 13:
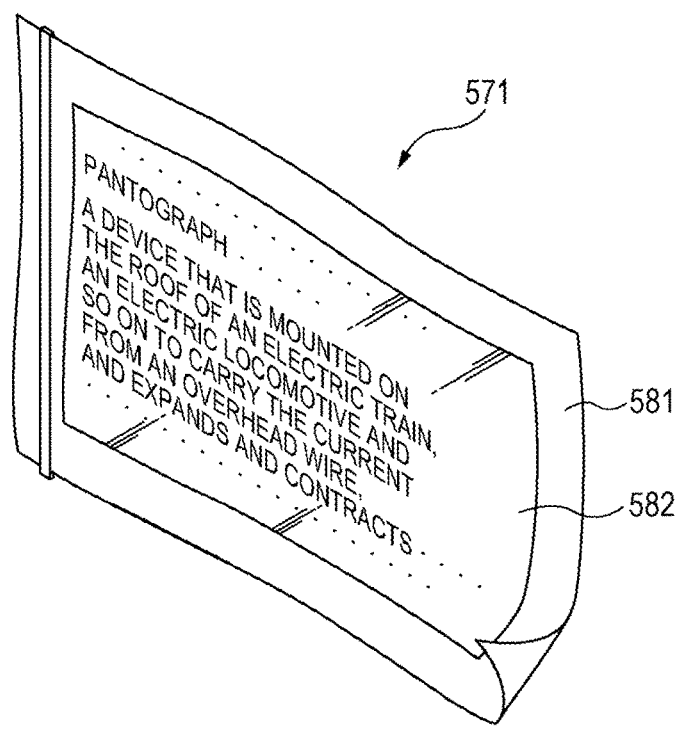
FIG. 13 is a perspective view of electronic paper, an example of electronic devices according to the one embodiment (the second embodiment) of the invention.

FIGS. 11 to 13 are diagrams illustrating outline configuration examples of electronic devices according to one embodiment (a second embodiment) of the invention. In this embodiment, specific examples of electronic devices to which the electrophoretic display device according to the above embodiment is applied are shown.

FIG. 11 is a perspective view of an electronic book 501, an example of electronic devices according to one embodiment (a second embodiment) of the invention.

The electronic book 501 includes a book-shaped frame 511, a display portion 512, and an operation portion 513. Further, the electrophoretic display device according to the above embodiment is applied to the display portion 512.

FIG. 12 is a perspective view of a watch 551, an example of electronic devices according to the one embodiment (the second aspect) of the invention.

The watch 551 includes a display portion 561, and the electrophoretic display device according to the above embodiment is applied to this display portion 551.

FIG. 13 is a perspective view of electronic paper 571, an example of electronic devices according to the one embodiment (the second embodiment) of the invention.

The electronic paper 571 includes a body portion 581 and a display portion 582. The body portion 581 is formed of a rewritable sheet having texture and flexibility that are similar to those of paper. Further, the electrophoretic display device according to the above embodiment is applied to the display portion 582.

Here, the electrophoretic device according to the above embodiment may be applied to other various electronic devices, and may be applied to, for example, display portions of electronic devices, such as a mobile phone and a portable audio device, a work sheet for a manual or the like, a textbook, an exercise book, and an information sheet.

Further, each of the electronic devices includes, for example, a controller, and allows the controller to control a display portion.

Further, the same effects as those in the electrophoretic display device according to the above embodiment are brought about to such electronic devices according to this embodiment.

Summary of Above Embodiment

One configuration example of the display device is that the display device (the display device 100 in the example shown FIG. 1) includes the display panel P1b and the covering portion CV. Further, the display panel P1b includes the driven area 10 and the non-driven area 20, and the covering portion CV includes the opening portion and covers the periphery portion of the display panel P1b. The driven area 10 of the display panel P1b is symmetric relative to the first straight line L1 passing on the figure center of the display panel P1b (this figure center being the display shape figure center CFPb in the example shown in FIG. 1), and the opening portion of the covering portion CV is symmetric relative to the second straight line L2 passing on the figure center of the covering portion CV (this figure center being the covering-portion shape figure center CFC in the example shown in FIG. 1). The first straight line and the second straight line are disposed parallel to each other, and one side portion (i.e., a "12 H" side portion in the example shown in FIG. 1) and the other side portion (i.e., a "6 H" side portion in the example shown in FIG. 1) that are included in the driven area 10 and covered by the covering portion CV and that are located opposite each other with the first straight line L1 located therebetween have their respective lengths (i.e., part of the first covered length CPDb1 and part of the second covered length CPDb2) that are different from each other in a direction perpendicular to the first straight line L1 (i.e., in the Y-axis direction in the example shown in FIG. 1).

One configuration example of the display device is that, in the display device, the display panel P1b includes the first substrate BP1, the second substrate BP2, the dispersion liquid 50, and the image formation portions (the areas 15 in the example shown in FIG. 3) The first substrate BP1 includes on itself the plurality of pixel electrodes 60. The second substrate BP2 includes on itself a facing electrode (the common electrode 70 in the example shown in FIG. 2) that faces the pixel electrodes 60. The dispersion liquid 50 is disposed between the first substrate BP1 and the second substrate BP2, and includes particles and a dispersion medium. Each of the image formation portions forms an image in accordance with the electric potential deference between the facing electrode and a corresponding one of the pixel electrodes 60.

One configuration example of the display device is that, in the display device, the light guiding plate LP is disposed at a second substrate BP2 side opposite the first substrate BP1. The light guiding plate LP guides light emitted from the light source LD.

One configuration example of the display device is that, in the display device, the driven area 10 and the opening portion have mutually similar shapes.

Heretofore, the embodiments according to the invention have been described in detail with reference to the drawings, but the specific configuration is not limited to the embodiments, and designs and the like that are not departed from the gist of the invention are included in the scope of the invention.

For example, the invention can be applied to display devices, such as a liquid crystal display (LCD). The invention can be also applied to, for example, a reflection type LCD using a front light. Here, in the structure of such a reflection type LCD, the disadvantage is unlikely to occur because the structure of the reflection type LCD has a viewing angle dependency and light is unlikely to transmit in oblique directions because of polarizations plates disposed in upper and lower portions of a polarization plate panel, but the invention may be applied to the reflection type LCD.

Further, in the above embodiment, a case where the invention is applied to a watch has been described, but the invention may be applied to the screen of a car navigation system, the screen of a game machine, and the screen of any other similar electronic device or machine as different configuration examples.

Moreover, a program for realizing the function of a component (for example, a controller) in the above-described devices (for example, display devices, such as the electrophoretic display device, and the electronic devices) may be recorded (stored) in a recording medium (a storage medium) retrievable from a computer, and a computer system may be allowed to retrieve and execute the program. Here, this "computer system" means a system including an operation system (OS) and hardware components of peripheral devices and any other device. Further, the "recording medium retrievable from a computer" means portable media, such as a flexible disk, a magneto-optical disk, a read only memory (ROM), and a compact disk (CD)-ROM, and storage devices, such as a hard disk, incorporated in the computer system. Moreover, the "recording medium retrievable from a computer" also includes a component retaining the program during a certain period of time, such as a volatile memory (a random access memory (RAM)) incorporated in a computer system serving as a server or a client for use in the transmission of the program via a communication link, such as the Interment or a telephone line.

Further, the above program may be transmitted from a computer system storing the program in a storage device or the like to a different computer system via a transmission medium or a transmission wave included in the transmission medium. Here, the "transmission medium" for transmitting the program means a network (communication network), such as the Internet, or a medium having the function of transmitting information, just like a communication link (communication line), such as a telephone line.

Further, the above program may be a program for realizing part of the above-described functions. Moreover, the above program may be a so-called difference file (a difference program) capable of realizing the above-described functions by being combined with programs that are stored in advance in a computer system.

The entire disclosure of Japanese Patent Application No. 2015-254129, filed Dec. 25, 2015 is expressly incorporated by reference herein.

What is claimed is:

1. A display device comprising:
a display panel including a non-driven area and a driven area and that is symmetric relative to a first straight line passing through a figure center of the driven area; and
a covering portion covering a peripheral portion of the display panel and including an opening portion and that is symmetric relative to a second straight line passing through a figure center of the opening portion,
wherein,
when the first straight line and the second straight line are viewed from a first direction side, the first straight line and the second straight line are disposed in parallel to each other on a plane, and
when the plane is viewed in a plan view, a first side portion of the driven area and a second side portion of the driven area that are covered by the covering portion and that are located opposite each other with respect to the first straight line have different lengths in a direction perpendicular to the first straight line.

2. The display device according to claim 1, wherein the display panel further includes a first substrate on which a plurality of pixel electrodes are disposed, a second substrate on which a facing electrode facing the plurality of pixel electrodes is disposed, and a plurality of image formation portions each including a dispersion liquid disposed between the first substrate and the second substrate and including particles and a dispersion medium, each of the plurality of image formation portions being configured to form a display image in accordance with an electric potential difference between the facing electrode and a corresponding one of the plurality of pixel electrodes.

3. The display device according to claim 2 further comprising:
a light source; and
a light guiding member disposed at a second substrate side opposite the first substrate and configured to guide light from the light source.

4. The display device according to claim 1, wherein the driven area and the opening portion have mutually similar shapes.

5. A display device comprising:
a display panel including a non-driven area and a driven area and that is symmetric relative to a first straight line passing through a figure center of the driven area; and
a covering portion that covers a peripheral portion of the display panel and that includes an opening portion, the covering portion being symmetric relative to a second straight line that passes through a figure center of the opening portion,
wherein the figure center of the display panel is offset from the figure center of the opening portion such that the covering portion covers the driven area on a first side of the first straight line by a greater distance than the covering portion covers the driven area on a second side of the first straight line.

* * * * *